United States Patent [19]
Hafele et al.

[11] 3,806,300
[45] Apr. 23, 1974

[54] APPARATUS FOR FORMING THE NECK ON A PLASTIC CONTAINER

[75] Inventors: Robert X. Hafele; William R. Ick, Jr., both of Overland Park, Kans.

[73] Assignee: Ethyl Development Corporation, Kansas City, Mo.

[22] Filed: May 27, 1971

[21] Appl. No.: 147,351

[52] U.S. Cl.............................. 425/387 B, 425/326 B
[51] Int. Cl................................................ B29c 17/07
[58] Field of Search ............... 264/94, 98, 161, 325; 425/387 B, 326 B, 342, 405, DIG.203, DIG. 204

[56] References Cited
UNITED STATES PATENTS

| | | | |
|---|---|---|---|
| 3,303,249 | 2/1967 | Strauss | 425/387 B |
| 3,531,556 | 9/1970 | Mehnert | 425/326 B |
| 3,597,793 | 8/1971 | Weiler et al. | 425/387 B |

FOREIGN PATENTS OR APPLICATIONS

| | | | |
|---|---|---|---|
| 713,736 | 9/1966 | Italy | 425/387 |

Primary Examiner—J. Spencer Overholser
Assistant Examiner—David B. Smith
Attorney, Agent, or Firm—Donald L. Johnson; John F. Sieberth; E. Donald Mays

[57] ABSTRACT

A process and apparatus for blow molding hollow plastic articles to provide a completely finished neck in the molding step. A plastic parison is received between separable mold halves and transported to a second location for blowing. A blow pin movable in the axial plane of the parison is provided with a shoulder structure adapted to provide a close sliding fit with the neck finish portion of the mold. The blow pin is inserted into the open end of the parison, and the shoulder structure compresses and finish forms the neck in one action during the blowing step.

3 Claims, 16 Drawing Figures

APPARATUS FOR FORMING THE NECK ON A PLASTIC CONTAINER

BACKGROUND OF THE INVENTION

1. Field of the Invention

This invention relates to a method and apparatus for blow molding plastic containers having a completely finished neck portion.

2. Description of the Prior Art

In the blow molding of plastic bottles, it has long been an objective to produce a bottle with a completely finished neck in the blowing step. Earlier methods and apparatuses for producing bottles from tubular parisons have not been completely effective in the removal of the waste or neck moil from the bottle subsequent to the blowing step. It is often necessary to subject the bottle to a secondary finishing operation to completely finish the neck portion of the bottle. A number of methods and apparatuses have been proposed for severing the neck moil from the bottle. In U.S. Pat. No. 3,031,718 the neck moil is removed from the bottle in the mold by twisting and severing the moil from the bottle prior to release from the mold. However, the bottle may still require a finishing step to produce a flat surface on the neck and to core the bottle for an exact inside diameter. One method for completely finishing the neck of a blow molded plastic container is shown in U.S. Pat. No. 2,940,120 wherein the neck portion of the bottle is injection molded, and a parison is then subsequently extruded, received in a blow mold, and expanded to complete the bottle. However, this method and apparatus require an elaborate and expensive apparatus for injection molding the neck and extruding and subsequently finishing the parison. In U.S. Pat. No. 3,164,646 an apparatus is disclosed for forming a finished, threaded portion of the neck. However, the neck portion of the bottle still has attached thereto a neck moil which must be subsequently removed by a secondary operation. U.S. Pat. No. 3,271,489 utilizes a blow pin having a shoulder for compressing the neck portion of the parison into the threaded neck portion of the blow mold; however, the arrangement of the apparatus still can result in the formation of a neck flash or waste portion which must be subsequently removed by finishing operations. U.S. Pat. No. 3,226,464 describes a method and apparatus for forming a plastic container wherein an internal parison mandrel is used inside the bottle to compress the plastic portion in the neck to a finished neck on the bottle. However, this process produces a bottle with an open bottom which must be subsequently closed by a secondary operation.

U.S. Pat. No. 2,890,483 describes an apparatus for producing a plastic container which utilizes a movable internal mandrel in the extruder to pinch off a parison and to subsequently compress this parison in a neck portion of the mold to produce a semi-finished neck on the plastic container. U.S. Pat. No. 3,470,582 also discloses an apparatus for producing plastic bottles. The apparatus includes a movable mandrel as a part of the extruder, which mandrel has a tip portion adapted to shear a waste portion from the bottle in an "in mold" neck finishing operation. However, this apparatus still produces a large amount of flash which must be subsequently removed from the bottle in a secondary operation. U.S. Pat. No. 3,084,395 describes an apparatus for blow molding hollow articles wherein a mandrel is inserted into the parison as it is extruded and subsequently moves down into the neck forming portion of the mold which is closed around the neck, and the neck portion is subsequently compressed by a shoulder provided on the blow pin to form the neck in the mold. However, the apparatus requires an aligned blow pin which must receive the parison and move downwardly with the parison. Difficulties have been encountered in extruding a parison to fit over a blow pin prior to closing of the neck portion of the mold there-around. Further, the apparatuses described in U.S. Pat. Nos. 3,084,395; 3,470,582; and 2,890,483 all require that the operation be conducted at the extruder position and are, thus, not suited for use in apparatuses for dual station blow molding machines wherein the parison is pinched off in the blow mold halves and subsequently moved away to a secondary blowing position.

From the foregoing, it can be seen that the blow molding industry is in need of a method and apparatus for completely finishing the neck of a plastic container without producing any waste or neck moil while it is retained in the mold at the secondary blowing position. Dual station blow molding machines currently in use do not provide a method and apparatus for accomplishing the above objectives.

SUMMARY OF THE INVENTION

It is an object of the present invention to provide a method and apparatus for blow molding plastic containers which produce a container with a completely finished neck during the molding step.

It is another object of the present invention to provide a method and apparatus for blow molding plastic containers which produce bottles having a finished neck portion completely free of flash or scrap plastic material.

It is still another object of the present invention to provide a method and apparatus for blow molding plastic containers having a completely finished neck, which apparatus is of simple construction and inexpensive.

It is also an object of the present invention to provide an apparatus for blow molding plastic containers which can produce bottles with finished necks having different configurations.

It is a further object of the present invention to provide a method and apparatus for blow molding plastic containers which can produce containers having a variety of neck heights.

It is a still further object of the present invention to provide a method and apparatus for blow molding plastic containers with completely finished necks that do not require any severing or pinching of the plastic material in the neck area of the containers.

It is still another object of the present invention to provide a method wherein a tubular parison is received within a split blow mold positioned below an extruder, which split blow mold is closed therearound and subsequently transported to a second position where a finished neck is produced on the container.

The foregoing objects and other advantages that are brought out hereinafter are realized in the apparatus aspects of the present invention in an apparatus for forming hollow plastic articles with in mold finished necks from tubular plastic parisons, which apparatus includes a split, hollow blow mold for receiving the parison, the blow mold providing a neck opening in a neck finishing area in one end thereof which engages and extends above the open end of the parison. A reciprocating blow pin is axially aligned with the parison and has a terminal portion adapted to engage the neck finishing area of the parison to completely form the article neck without producing waste plastic. The terminal portion of the blow pin includes a tapered end portion, a first cylindrical portion, a second cylindrical portion having a larger diameter than the first cylindrical portion and joined thereto by means of an annular shoulder, a third cylindrical portion having a larger diameter than the second cylindrical portion and joined thereto by means of an annular shoulder, which shoulder abuts the outer surface of the mold adjacent the neck finishing area when the blow pin is inserted in the open end of the parison.

The process aspects of the present invention are realized in a process for forming hollow plastic articles within mold finished necks from tubular plastic parisons which includes the steps of positioning the parison in a split blow mold with at least one end of the parison open; confining the open end of the parison with a neck forming portion of the blow mold; and compressing that portion of the parison confined by the neck forming portion of the blow mold by applying pressure to the top of the open end of the parison thereby completely forming a finished neck on the article without producing any waste plastic material.

Some of the advantages of the method and apparatus of the present invention include the ability to completely form a finished neck in the mold during the blowing step without producing any waste plastic moil or neck waste which must be subsequently removed after the bottle is blown. Further, the present invention provides a method and apparatus wherein a parison can be extruded and received in a split blow mold and the split blow mold, together with the enclosed parison, subsequently transported to a second blowing position outside of the area of the extrusion position. A specially modified blow pin is utilized in the blowing position to engage the open end of the plastic parison to compress the upper end of the parison within the neck forming area of the split blow mold to produce a completely finished neck on the plastic container without the production of any subsequent waste plastic portion. The present invention is particularly suited for use in multiple station blow molding machines, either of the rotary table type or the dual blow station type, wherein the blow molds are reciprocated to the side of the parison extrusion station to blow the bottle and subsequently cool and eject the container from the blow mold. The apparatus provides a simple mechanical arrangement for producing a finished neck on a container during the blowing step as opposed to that utilized by the prior art wherein it has been necessary to form the necks of the container in a position in axial alignment with the blow mold extrusion station. Thus, a conventional parison extruder can be used which does not require complicated internal moving mandrel arrangements for severing and finishing the neck of the plastic container in an area immediately underneath the extruder. Furthermore, a variety of containers can be produced having different neck heights by varying the location of the neck forming shoulder on the blow pin assembly. Also, the method and apparatus of the present invention can produce containers with completely finished necks without severing or pinching any neck moil from the containers. This eliminates the critical alignment and wear problems associated with prior art apparatuses that utilize an anvil on the blow mold and a cutter sleeve on the blow pin or mandrel to separate the neck moil from the container.

DESCRIPTION OF THE PREFERRED EMBODIMENTS

Figure 1:
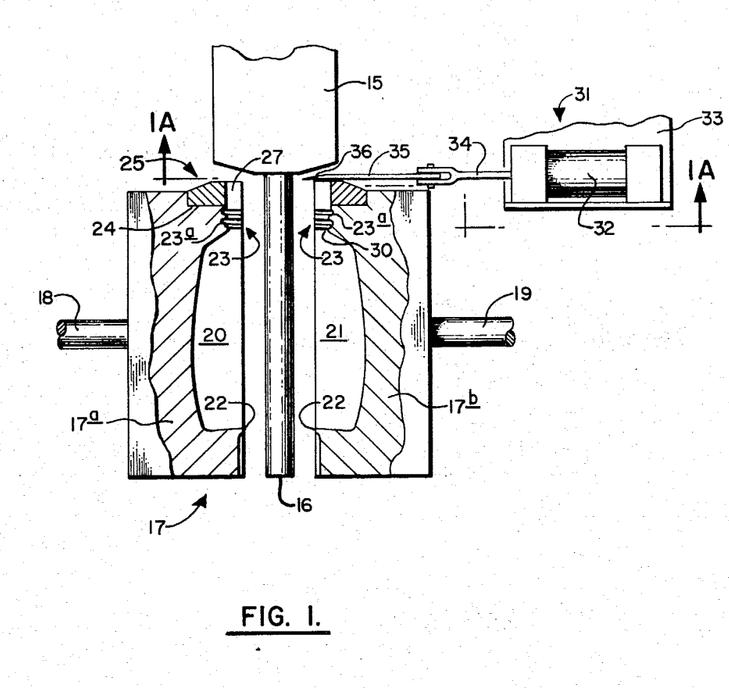
FIG. 1 is an elevational view, partially in section, of an extruder and split blow mold assembly adapted for use in the present invention at the extrusion station position.
Figure 2:
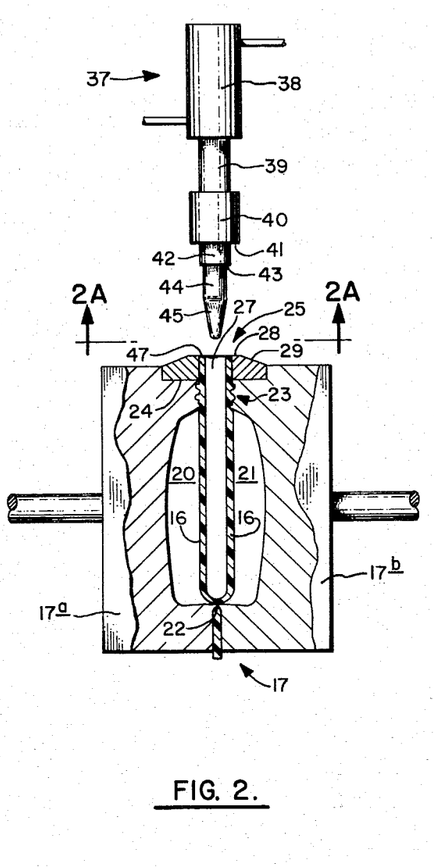
FIG. 2 is an elevational view, partially in section, of the split blow mold portion of the present invention shown in the blow station position with the blow pin and neck forming apparatus positioned above.
Figures 3, 4:
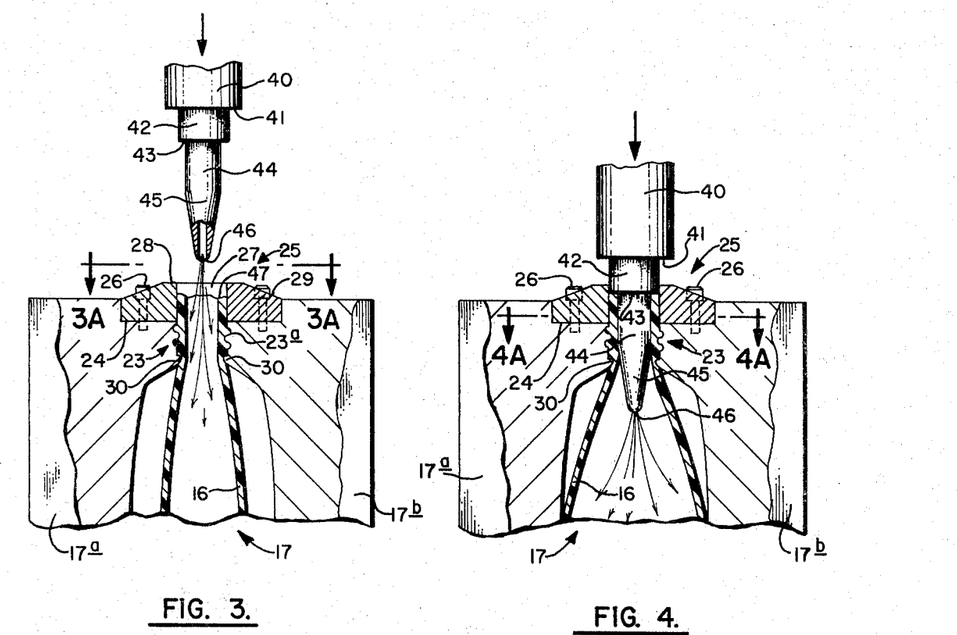
FIG. 3 is a broken, elevational view, partially in section, of the apparatus as shown in FIG. 2 with the blow pin descending into the split mold.
FIG. 4 is a view similar to FIG. 3 showing the blow pin moving into the open neck area of the blow mold apparatus.
Figure 3A:
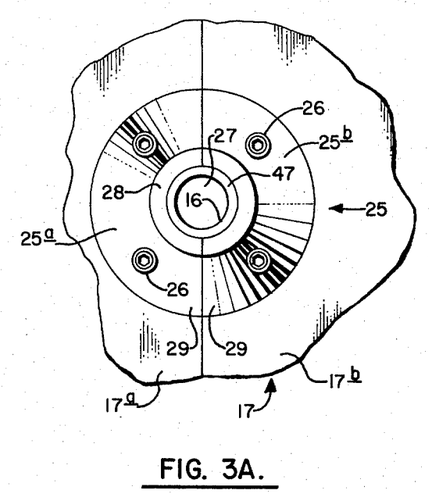
FIG. 3A is a top plan view of the apparatus of FIG. 3 taken along the line 3A—3A.

Referring now to FIG. 1, there is schematically depicted a blow molding apparatus for carrying out the present invention. The apparatus as shown in FIG. 1 is particularly suitable for blowing plastic bottles on blow molding apparatuses which are commonly known as dual station blow molding machines. The apparatus as seen in FIG. 1 depicts the position of the apparatus at the extrusion station involved in the extrusion and the trapping of the extruded plastic parison within the blow mold halves prior to subsequent removal to the blowing station. A plastic extrusion apparatus, which may be any readily available, well-known plastics extruder for extruding thermoplastic material, feeds a parison extrusion head 15 which extrudes a tubular, cylindrical, plastified, thermoplastic parison 16 from the extrusion orifice. The parison 16 passes through the center line of an opened blow mold, designated generally by the numeral 17, which includes a pair of movable, split mold halves 17a and 17b. Push rod 18 is connected to mold half 17a, and push rod 19 is likewise connected to mold half 17b and are adapted to move in a horizontal direction to close the mold halves about the parison. Push rods 18 and 19 are connected to power cylinders (not shown) which actuate the mold halves. Mold half 17a is provided with an internal cavity 20 which forms one-half of the cavity in the blow mold for producing the hollow container. Mold half 17b contains a matching blow mold cavity 21. The bottom of mold cavities 20 and 21 terminate in sharp pincer edges 22—22 at their lower ends, which edges are adapted to pinch the parison closed to seal the same as shown in FIG. 2. The upper end of the blow mold halves are provided with a central neck opening defined by the neck finish area, designated generally by the numeral 23. The neck finish area is provided with a spiral groove 23a which is adapted to form the threaded neck on the container when the upper end of the parison is pressed tightly into the neck finish area 23. The top surface of the blow mold 17 may be provided with an annular recess 24 in which is received an annular compression collar, designated generally by the numeral 25. The collar is split along the axial dividing plane of the low mold halves 17a and 17b and includes a left, semi-circular half 25a and a right, semi-circular half 25b as can be seen more clearly in FIG. 3A. Each of the compression collar halves 25a and 25b are rigidly attached to the top of the blow mold by means of bolts 26 received in threaded bores provided in the recessed portion of the blow mold. Compression collar 25 is provided with an axial, cylindrical opening 27 which may have the same diameter as the neck finishing area 23 in the mold halves 17a and 17b as can be seen more clearly in FIG. 3. Collar 25 is provided with a flat, annular, top surface 28 surrounding the opening 27 as can be seen in FIGS. 3 and 3A. An upwardly sloping, conical surface 29 extends from the periphery of the annular collar 25 and merges with the flat surface 28 of the collar 25. Optionally, the recess 24 and the annular compression collar 25 can be omitted, if desired, and the shoulder 41 permitted to abut the top surface of the mold 17 to limit travel of the blow pin into the neck forming area 23 of the blow mold.

Figure 6:
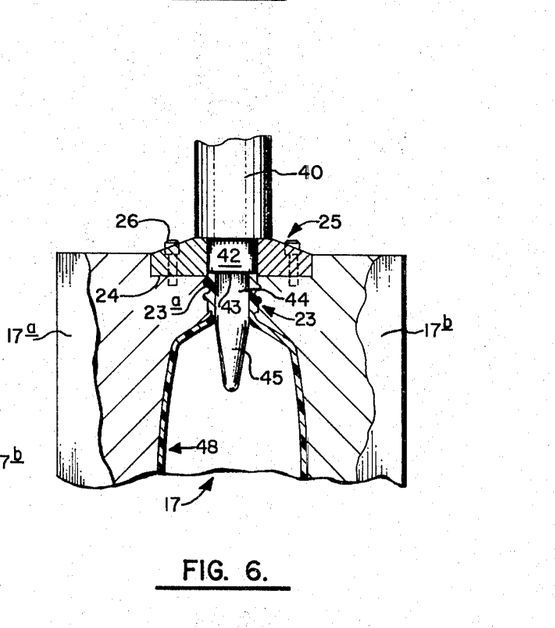
FIG. 6 is a view similar to FIG. 3 showing the bottle in the finished, completely blown state.
Figure 6A:
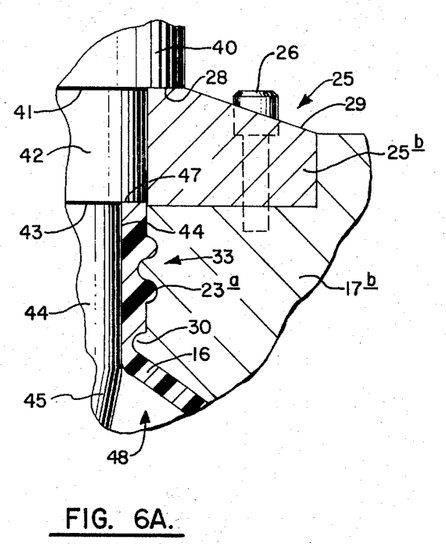
FIG. 6A is an enlarged, broken, elevational, sectional view of the neck forming portion of the blow molds and the portion of the blow pin as seen in FIG. 6.

As seen more clearly in FIGS. 3 and 6A, the neck finish portion 23 of the mold halves may include an annular, inwardly projecting ring 30 at the lower extremity of the mold finish area.

Figure 1A:
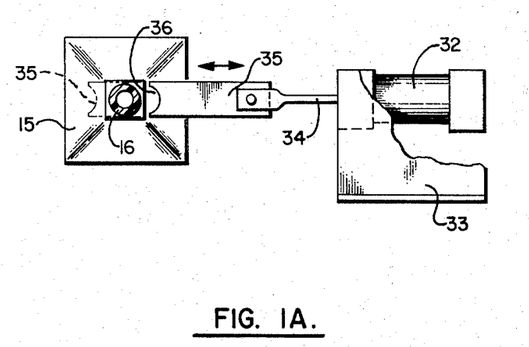
FIG. 1A is a bottom plan view of the apparatus of FIG. 1 taken along the line 1A—1A.

Referring to FIG. 1, after the extruder head 15 extrudes a parison 16 which extends to the lower portion of the open mold halves, a cutter apparatus, designated generally 31, severs the parison from the extruder at the instant the parison is confined by the closing mold halves and retained therein. As seen in FIGS. 1 and 1A, the cutter apparatus includes a double-acting, hydraulic or pneumatic cylinder device 32 which is mounted on a support bracket 33. The cylinder has a piston rod 34 projecting from the forward end thereof to which is attached a cutter blade 35. The cutter blade terminates in an arcuate recess 36 which has the shape of the parison and is adapted to sever the parison from the end of the extruder by rapid movement across the flat top surface 28 of the collar 25.

Figure 2A:
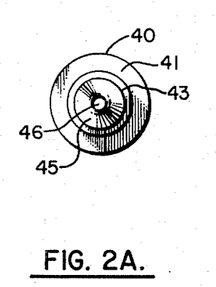
FIG. 2A is a bottom plan view of the apparatus of FIG. 2 taken along the line 2A—2A.

After mold halves 17a and 17b are closed around the parison 16 and the parison is severed from the extruder head, the closed mold 17 moves from under the extruder head 15, either to the right or the left or in a downward movement, to a blow station as depicted in FIG. 2. At the blow station a blow pin assembly, designated generally by the numeral 37, is mounted on a bracket or mounting means (not shown) in axial alignment with the axis of the closed blow molds and the enclosed parison 16. The blow pin assembly includes a double-acting power cylinder 38, which may be either pneumatically or hydraulically operated, from which extends a vertically movable shaft 39. The shaft 39 is provided with an enlarged cylindrical section 40 which terminates in its lower end at a sharp annular shoulder 41. The diameter of the upper cylindrical section 40 may be substantially the same as the diameter of the flat annular top portion 28 of the compression ring 25. Immediately below the enlarged cylindrical section 40, the blow pin is provided with a second reduced sized cylindrical section 42 which has a diameter only slightly smaller than the neck opening provided in the annular collar 25 so as to make a close sliding fit therewith. The second cylindrical section 42 terminates at its lower end in a second annular shoulder 43 as can be seen more clearly in FIG. 2A. A generally cylindrical neck bore forming section 44 of the blow pin has a diameter which is substantially equal to the finally desired diameter for the inside of the bottle neck of the container to be formed. The tip 45 of the blow pin assembly is provided with generally conically shaped walls and terminates in an opening 46 at the lower end thereof as seen in FIG. 3. Blow pin opening 46 continues up through the aforementioned sections of the blow assembly and is connected to a source of compressed gas (not shown), such as air, nitrogen, carbon dioxide, whereby cooling and fluid pressure may be applied to the interior of the parison 16 within the blow mold halves to conform the parison to the shape of the cavity 20, 21 defined by the blow mold halves 17a and 17b.

Figure 4A:
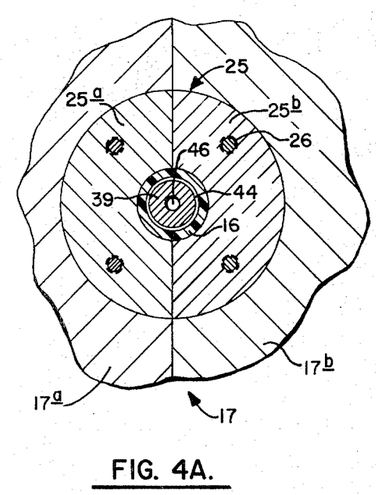
FIG. 4A is a sectional view of the apparatus of FIG. 4 taken along the line 4A—4A.
Figure 5:
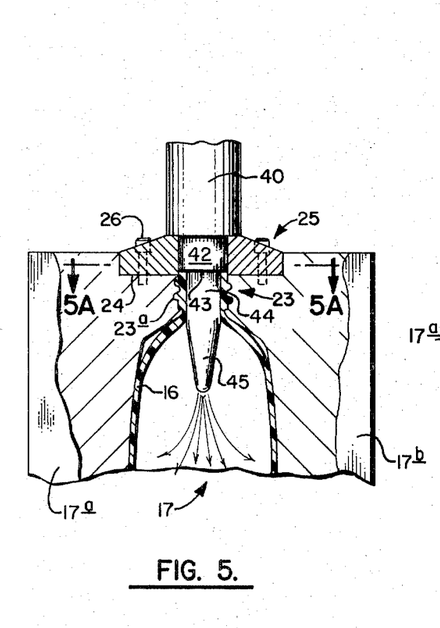
FIG. 5 is a view similar to FIG. 3 showing the blow pin in the final rest position abutting the top of the blow mold apparatus.
Figure 5A:
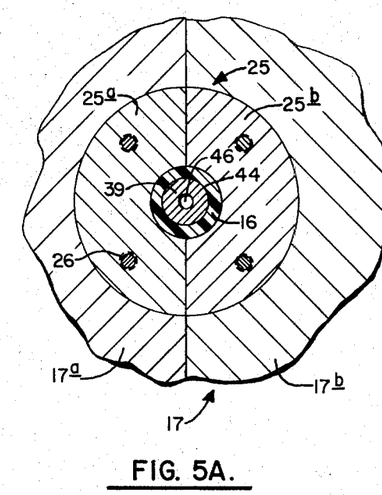
FIG. 5A is a sectional view of the apparatus of FIG. 5 taken along the line 5A—5A.
Figure 6B:
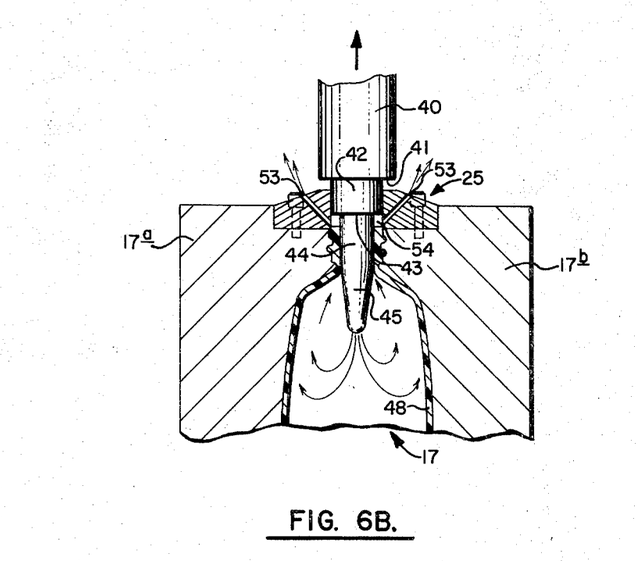
FIG. 6B is a view similar to FIG. 6 showing the blow pin in a slightly raised position to permit circulation of cooling gas through the interior of the bottle.

As seen in FIGS. 1 and 2, the knife 35 cuts the parison substantially flush with the top surface of the compression collar 25, and the top surface 47 of the parison is, thus, initially, substantially even with or slightly below the top surface 28 of the collar. The mold 17 and confined parison 16 are then moved to the blow station underneath the blow pin assembly 37. Blow pin assembly 37 is then actuated to move shaft 39 in the downward direction as shown in FIG. 3. At the time the blow pin begins to move in the downward direction, air or other cooling fluid is supplied at high velocity through the opening 46 and begins to cool the upper end of the trapped parison 16 and expands it into contact with the neck finishing portion 23 of the blow mold. This cooling causes the upper portion of the parison to begin to contract and to recede within the compression collar 25 as seen in FIG. 3. Contraction of the upper end of the parison is limited to the portion retained within the neck finishing section 23 of the blow mold halves by means of the annular ring 30 which projects outwardly from the neck finishing section and is pressed into the wall of the parison to restrain any substantial downward movement of the parison, as can be seen in FIGS. 3, 4 and 6A. The blow pin continues to move downwardly as seen in FIG. 4 wherein the tip 45 enters the open end of the parison and the bore forming section 44 of the blow pin is received inside the open end of the parison. Shoulder 43 at the lower end of cylindrical section 42 abuts the top surface 47 of the parison and begins compression of the upper end of the parison into the neck finishing section 23 of the blow molds. As seen more clearly in FIG. 4A, the cylindrical bore forming section 44 of the blow pin has a diameter slightly less than the inside diameter of the original parison as it is extruded from the extruder. This permits the blow pin tip 45 and the bore forming cylindrical section 44 to initially enter the upper end of the parison without making any substantial contact therewith. This prevents dragging or distorting the neck wall area of the parison and provides uniform distribution of plastic within this area. As seen in FIG. 5, the blow pin continues to move downwardly in the neck of the parison thereby compressing the upper end of the parison extending above the annular ring 30 to compress the plastic material thereabove to completely form the threads for the neck of the container and to closely press the parison against the bore forming portion of the blow tip 44. As seen in FIG. 5, the plastic material completely fills the space between the cylindrical surface 44 of the intermediate bore forming section of the blow pin and the wall finishing area 23 of the blow mold halves. During this compression and packing step by the blow pin assembly, gas is continuously expressed through the channel 46 in the blow pin to expand the walls of the parison into firm contact with the inner walls of the blow mold 17 and to thereby assume the contour of the cavities 20 and 21 of the blow mold halves. This pressure is continued until the container takes the final shape of the mold as seen in FIG. 6. The blow pin assembly can then be raised slightly, if desired, so that gas may be circulated through the interior of the blown plastic bottle 48 to chill the interior walls of the bottle, as seen more clearly in FIG. 6B. If desired, the compression collar 25 may be provided with a plurality of air passages 53 leading from the annular space 54 (between the bottom of shoulder 43 and the top surface 47 of the parison) upwardly to the atmosphere to achieve a higher circulation rate for the cooling gas through the interior of the bottle 48. A cooling liquid is also circulated through channels (not shown) in the blow mold 17 as is well known in the art.

As seen more clearly in FIG. 6A, the height of the cylindrical bore forming section 44 of the blow pin assembly can be substantially equal to the height of the neck of the container 48. This assures that even pressure is applied over the interior wall surface of the neck of the container to provide a completely finished inside and outside wall for the neck section of the container. The height of the second cylindrical section 42 which is received within the opening 27 provided in the collar 25 is generally of the same height as the depth of the opening in the collar whereby the shoulder 43 is generally, substantially opposite the edge of the blow mold halves 17a and 17b at their periphery which surrounds the neck finishing area 22 of the blow mold. However, if it is desired to provide a longer or shorter neck on the container, the height of section 42 can be adjusted to provide the desired neck height. Lower shoulder 41 on the upper enlarged section 40 of the blow pin assembly abuts the annular flat top surface 28 of the annular collar 25 to arrest the downward motion of the blow pin. The depth of the collar 25 is adjusted for the desired quantity of plastic necessary to completely fill the neck finish area 23 of the blow mold to provide a completely finished neck without the necessity of forcing any substantial quantity of plastic material past the annular ring 30 down into the shoulder of the container 48. Annular ring 30 also serves the purpose of a restriction between the neck finishing area 23 in the blow mold and the cylindrical bore forming section 44 of the blow pin to restrict flow of the plastic material downwardly into the shoulder section of the container 48. Compaction of the plastic within the neck finishing area 23 by the shoulder 43 on the blow pin provides a complete fill of the recesses 23 to form the threads on the outer wall of the neck of the container.

Figure 7:
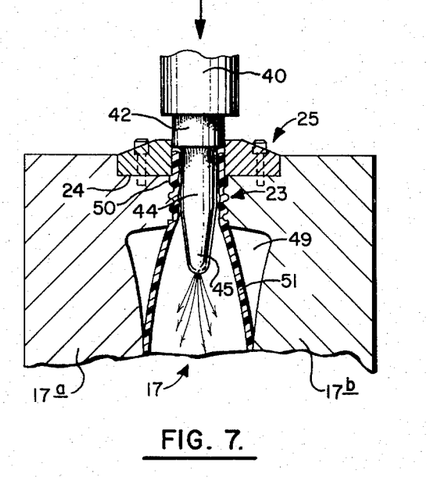
FIG. 7 is a sectional, elevational view of another embodiment of the blow mold apparatus of the present invention showing the blow pin as it enters the neck portion of the blow mold.
Figure 8:
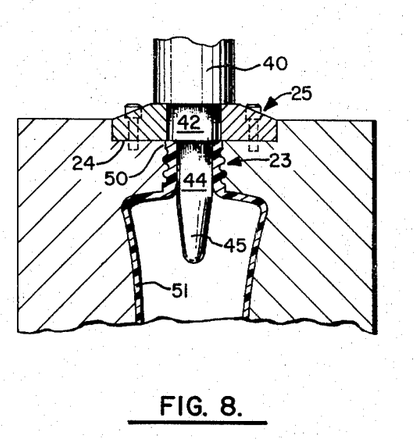
FIG. 8 is a view similar to FIG. 7 showing the blow pin in the fully inserted position and the bottle as completely blown.
Figure 8A:
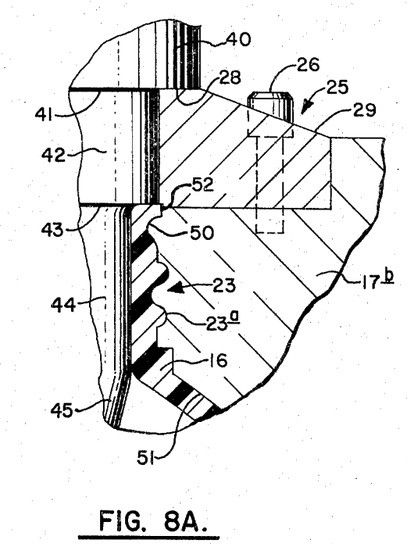
FIG. 8A is an enlarged, elevational, broken, sectional view of the neck portion of the blow mold apparatus and a section of the blow pin as seen in FIG. 8.

Referring now to FIGS. 7, 8 and 8A, a second embodiment of the invention is shown wherein a container cavity 49 is provided in the blow mold having a flared upper section. In this embodiment of the invention, the annular ring 50 is placed at the upper end of the neck finishing section 23 of the blow mold halves to engage the parison adjacent its upper end and prevent contraction and compression of the parison into the shoulder of the plastic container 51. When this type ring is utilized in the blow mold halves, the container neck top surface is provided with a dripless top section 52 which is desired in containers for dispensing liquid products in order to avoid excessive rundown of liquid products onto the neck of the container.

From the foregoing, it can be seen that the method and apparatus of the present invention provide a system for producing hollow plastic containers made from thermoplastic materials such as polyethylene, polypropylene, and polyvinyl chloride wherein the neck of the container is completely finished within the mold during the blow molding steps. No additional finishing of the neck is required since the shoulder 43 of the blow pin completely finishes the top surface of the container and also forces plastic material into the threaded recesses in the neck finishing area of the mold to thereby form the finished threads and also form a completely cylindrical sized inner wall in the plastic container neck area without producing any waste plastic material.

While the invention has been described with reference to a blow mold having the container neck finishing area in the top of the blow mold, it is understood that the invention can be practiced using a blow mold having the neck finishing area in the bottom of the mold. The blow pin assembly can be mounted below the blow mold at the blow station and moved upwardly into engagement with the open lower end of the parison. If desired, axially aligned, dual cavity molds may be used with a blow pin assembly positioned both above and below the mold.

When the invention is utilized in a dual station blow molding apparatus, a second blow mold and blow pin are provided at a second blow station. The second blow mold is moved under the extruder and receives a parison when the first blow mold is in the blowing position at the first blow station. The second blow mold then moves to the second blow station while the first blow mold returns to the extruder to receive another parison.

There has been described what is considered preferred embodiments for practicing the present invention; however, it will be understood that other methods and apparatuses may be utilized for carrying out the invention. The invention is to be limited solely by the claims.

What is claimed is:

1. In an apparatus for forming hollow plastic articles with in-mold finished necks from tubular plastic parisons, the combination comprising:
   a. a split, hollow blow mold for receiving said parison, said blow mold providing a neck opening and a neck finishing area in one end thereof which engages and extends above the open end of said parison;
   b. reciprocating blow pin axially aligned with said parison and having a terminal portion adapted to engage said neck finishing area and said parison when said parison is engaged by said neck finishing area to completely form said article neck without producing waste plastic, said terminal portion including,
      i. an upper first cylindrical section having a diameter greater than said neck openings,
      ii. a second cylindrical section having a smaller diameter than the minimum diameter of said neck opening to be receivable therein and fixedly joined to said first cylindrical section by means of a flat annular shoulder, which shoulder abuts the outer surface of said mold adjacent said neck finishing area when said blow pin is fully inserted into the open end of said parison,
      iii. a third cylindrical section having a smaller diameter than said second cylindrical section and the inside diameter of said parison to be received in said parison and joined to said second cylindrical section by means of a flat annular shoulder which abuts and compresses the end of said parison when said blow pin is inserted in said neck opening, said third cylindrical section having a length substantially equal to the length of the neck portion of said hollow plastic article, and
      iv. a conically tapered tip section joined directly at its upper end to the lower end of said third cylindrical section.

2. In the apparatus of claim 1 wherein said annular compression collar insert is provided with at least one air passage having an opening in the lower interior wall of said collar.

3. In an apparatus for forming hollow plastic articles with in-mold finished necks from tubular plastic parisons, the combination comprising:
   a. a split, hollow blow mold for receiving said parison, said blow mold providing a neck opening and a neck finishing area in one end thereof which engages and extends above the open end of said parison, said neck finishing area including an annular recess surrounding said neck opening and an annular compression collar received in said recess and projecting above the surface of said blow mold;
   b. a reciprocating blow pin axially aligned with said parison and having a terminal portion adapted to engage said neck finishing area and said parison when said parison is engaged by said neck finishing area to completely form said article neck without producing waste plastic, said terminal portion including,
      i. an upper first cylindrical section having a diameter greater than said neck openings,
      ii. a second cylindrical section having a height substantially the same as the thickness as said annular compression collar insert and a smaller diameter than the minimum diameter of said neck opening to be receivable therein and fixedly joined to said first cylindrical section by means of a flat annular shoulder, which shoulder abuts the outer surface of said mold adjacent said neck finishing area when said blow pin is fully inserted into the open end of said parison,
      iii. a third cylindrical section having a smaller diameter than said second cylindrical section and the inside diameter of said parison to be received in said parison and joined to said second cylindrical section by means of a flat annular shoulder which abuts and compresses the end of said parison when said blow pin is inserted in said neck opening, said third cylindrical section having a length substantially equal to the length of the neck portion of said hollow plastic article, and
      iv. a conically tapered tip section joined directly at its upper end to the lower end of said third cylindrical section.

* * * * *

PO-1050
(5/69)

UNITED STATES PATENT OFFICE
CERTIFICATE OF CORRECTION

Patent No. 3,800,300                Dated  April 2, 1974

Inventor(s)  Robert X. Hafele et al

It is certified that error appears in the above-identified patent and that said Letters Patent are hereby corrected as shown below:

Column 9, line 10, reads "b   reciprocating", should read -- b   a reciprocating --.  Column 9, line 40, reads "Claim 1", should read -- Claim 3 --.

Signed and sealed this 17th day of September 1974.

(SEAL)
Attest:

McCOY M. GIBSON JR.                 C. MARSHALL DANN
Attesting Officer                    Commissioner of Patents